United States Patent [19]
Fukano et al.

[11] Patent Number: 5,864,427
[45] Date of Patent: Jan. 26, 1999

[54] POLARIZER AND PRODUCTION METHOD THEREOF

[75] Inventors: Toru Fukano; Masato Shinya, both of Uji; Yasushi Sato, Tsuzuki-gun, all of Japan

[73] Assignee: Kyocera Corporation, Kyoto, Japan

[21] Appl. No.: 652,854

[22] Filed: May 23, 1996

[30] Foreign Application Priority Data

May 23, 1995 [JP] Japan .................................... 7-123937
Dec. 26, 1995 [JP] Japan .................................... 7-339770

[51] Int. Cl.$^6$ ............................ G02B 5/30; C03B 19/01; B05D 5/06
[52] U.S. Cl. ......................... 359/492; 359/900; 65/17.3; 65/63; 427/163.1; 427/171; 372/703
[58] Field of Search .................................... 359/492, 900, 359/490; 427/163.1, 165, 171, 212, 213.31, 229; 65/17.3, 21.1, 63, 17.5; 372/703

[56] References Cited

U.S. PATENT DOCUMENTS

| | | | |
|---|---|---|---|
| 4,339,256 | 7/1982 | Simms | 65/32 |
| 4,486,213 | 12/1984 | Lentz et al. | 65/30.11 |
| 5,122,907 | 6/1992 | Slocum | 359/492 |
| 5,365,054 | 11/1994 | Fathauer et al. | 250/214.1 |
| 5,401,587 | 3/1995 | Motohiro et al. | 428/688 |

FOREIGN PATENT DOCUMENTS

| | | | |
|---|---|---|---|
| 521591 | 1/1993 | European Pat. Off. | C03C 3/00 |
| 719742 | 7/1996 | European Pat. Off. | C03C 14/00 |
| A 4-109202 | 4/1992 | Japan | 372/703 |
| 6273621 | 9/1994 | Japan | G02B 5/30 |
| 7056018 | 3/1995 | Japan | G02B 5/30 |

OTHER PUBLICATIONS

Kazutaka Baba, et al., "Anisotropic optical media from laminate island films; theory", 1991 J. Optical Society of America, pp. 619–624. vol. 8, No. 4.

Kazutaka Baba, et al., "Optical polarizer using anisotropic metallic island films with a large aperture and a high extinction radio", Optics Letters, vol. 16, No. 12., Jun. 15, 1991. Optical Society of America, pp. 964–966.

Jun-ichiro Katsu, et al., "Fabrication of Stretched Gold Island Films with Large Optical Anistropy", Electronic and Communication in Japan, Part 2, vol. 7. May 1993 pp. 21–25.

Mark J. Bloemer, "Versatile Waveguide Polarizer Incorporation and Ultrathin Discontinuous Silver Film", Appl. Phys. Lett. 61(14) Oct. 5, 1992, pp. 1619–1621.

Kazutaka Baba, et al., "Silver–gold compound metal island films prpared by using a two step evaporation method", Appl. Phys. Lett 62(5), Feb. 1, 1993. pp. 437–439.

*Primary Examiner*—Cassandra C. Spyrou
*Assistant Examiner*—John Juba, Jr.
*Attorney, Agent, or Firm*—Loeb & Loeb LLP

[57] ABSTRACT

A metal such as Au and a dielectric such as borosilicate glass are simultaneously sputtered to form a film on a glass substrate. Next, this film is heated to grow metal particulates. Next, the substrate is drawn on heating to give an anisotropy to the metal particulates and produce a polarizer. The metal particulates are spheroidal and are dispersed almost homogeneously in the dielectric.

11 Claims, 3 Drawing Sheets

POLARIZER AND PRODUCTION METHOD THEREOF

FIELD OF THE INVENTION

The present invention relates to a polarizer wherein anisotropic metal particulates are dispersed in a dielectric and the production method thereof.

PRIOR ART

Polarizers are used for obtaining polarized light in a specific direction, and are used in optical communication, photosensors, optical interferometers, etc. For example, in the case of optical communication, polarizers are principal components of the optical isolator. The optical isolator comprises a first polarizer, a Faraday rotator and a second polarizer arranged in a holder, with magnets being arranged coaxially around them. The holder is made of, for example, a Ni–Fe alloy, etc., and the pularizers are joined onto the holder with sealing glass or solder and sealed hermetically. With regard to the polarizing performance, the value relative to the wavelength used for optical communication is important. The optical isolator is used in combination with a laser diode, etc.; the first polarizer polarizes light in a specific direction and takes it out, the Faraday rotator rotates the direction of polarization, and the second polarizer further rotates the direction of polarization and takes out the polarized light.

Polarizers in current use are mainly those wherein spheroidal silver particulates are dispersed in glass (the Japanese Patent Publication Hei-2-40619 and corresponding the U.S. Pat. Nos. 4,486,213 and 4,479,819). This polarizer is made by heat-treating a glass substrate containing silver and halogen to precipitate particulates of silver halide, and drawing the glass substrate on heating to stretch the silver halide particulates into spheroids. This process makes the silver halide particulates. Next, the glass substrate is heated in a reducing environment to reduce silver halide to metal silver. In this polarizer, however, the aspect ratios are not homogeneous; it is hard to precipitate silver particulates of which major axes and minor axes are homogeneous, respectively. Moreover, it is difficult to reduce residual silver halide in the glass, hence opaque silver halide remains. Furthermore, because the glass shrinks in the course of the reduction of silver halide, the glass surface becomes porous, resulting in a drop in the long-term stability.

To solve such problems, it has been proposed to produce polarizers by applying thin film processes such as vacuum evaporation and sputtering (Denshi Joho Tsushin Gakkai, Autumn General Meeting of 1990, Preprint C-212). According to this proposal, a metal layer is deposited on a dielectric substrate such as glass by vacuum evaporation, and a dielectric layer such as glass is made on the metal layer by sputtering, etc. In this way, several metal layers and dielectric layers are formed alternately. Then the substrate is drawn on heating to deform the metal layers into layers of discontinuous and insular metal particulates. The metal particulates of the metal particulate layers are drawn in the drawing direction to become spheroidal and exhibit a polarizing capability.

The present inventors, however, identified the following problems in the polarizer using the thin film processes:
1) Since it is difficult to precipitate large metal particulates, the extinction ratio between the polarizing direction and a direction perpendicular to it is low; and
2) As the extinction ratio is low, it is necessary to increase the extinction ratio by increasing the number of layers, but the layers may peel off the substrate when the number of layers is increased.

SUMMARY OF THE INVENTION

The task of the present invention is to provide polarizers which have high extinction ratios and are free of peeling from the substrate, and to provide optical isolators using these polarizers.

The present invention is a polarizer wherein on at least one main face of a transparent dielectric substrate is provided a polarizing layer in which anisotropic metal particulates are dispersed virtually homogeneously.

It is sufficient for the substrate to be transparent, and any dielectric may be used, but preferably a substrate and a dielectric virtually of the same kind are used to have one common coefficient of thermal expansion for both the substrate and the dielectric. This is effective in preventing the polarizing layer from peeling off from the substrate. For the substrate, glass is preferable, which is inexpensive, easily drawable and transparent. Borosilicate glass is preferable, which has a coefficient of thermal expansion similar to that of a Ni–Fe alloy. Hence both said dielectric substrate and said dielectric of said polarizing layer are made of borosilicate glass.

For the metal particulates, a metal which can easily coagulate, has a bad wettability with glass and is hardly oxidized is preferable. At least one material is preferably selected from a group comprising, for example, precious metals, Cu, Fe, Ni and Cr. The most preferable materials are Au, which has a low melting point, has a bad wettability with glass and is hardly oxidized, and Cu, which is inexpensive. The metal content in the polarizing layer is preferably from 5 to 15% by volume, and in this range, the metal particulates do not form a different phase, and the metal content can be in the polarizing layer can be raised to a relatively high level to increase the extinction ratio.

The aspect ratio of the metal particulates is preferably from 10 to 30 in average, and most preferably from 15 to 25. The mean major axis length of the metal particulates is preferably from 10 to 300 nm, and more preferably from 30 to 200 nm, and most preferably from 40 to 200 nm. The mean minor axis length of the metal particulates is preferably from 1 to 10 nm, and more preferably from 2 to 10 nm.

To produce such a polarizer, for example, a thin film of a mixture of a dielectric and a metal is formed on at least one main face of a transparent dielectric substrate, then said mixture thin film is heated to make the metal in the mixture thin film coagulate to form metal particulates, after that, said substrate and said mixture thin film are drawn on heating to stretch said metal particulates into spheroids.

Here, preferably, only a single layer of said mixture thin film is formed. When a mixture thin film of a dielectric and a metal is used, a single layer can provide a sufficient extinction ratio, and use of multiple layers has a possibility of peeling off of the polarizing layer. Such a polarizer is combined with, for example, a Faraday rotator, a magnet and a holder to make an optical isolator.

According to the present invention, a mixture thin film of a metal and a dielectric is deposited, and this mixture thin film is heated to coagulate the metal. This heating temperature is preferably lower than the softening point of the dielectric substrate. When the mixture thin film is heated, the metal particulates will coagulate with each other to form relatively large metal particulates. Next, when the substrate and the mixture thin film are drawn, the metal particulates will be stretched in the drawing direction to acquire anisotropy. As a result, the metal particulates become spheroidal. Let us compare the polarizer according to the present invention with the prior art wherein metal thin films and dielectric thin films are deposited alternately. In the prior art, because a dielectric thin film is present between two metal thin films, metals do not coagulate across the dielectric thin films, thus large metal particulates hardly grow. As a result, the extinction per one layer is small, and many layers must be deposited. The present inventors have found that the greater is the number of the deposited layers and the greater is the total film thickness of the polarizing layer, the greater is the possibility for the polarizing layer of peeling off from the substrate. In contrast, according to the present invention, because a mixture thin film is used, it is sufficient to deposit a single layer, and no peeling will happen. The present inventors have also found that according to the present invention peeling does not occur even when the film thickness of the polarizing layer is increased to 1 $\mu$m or over.

The present invention also is a production method of a polarizer comprising repeating the following steps A, B and C plural times in this order on at least one main face of a transparent dielectric substrate, then taking the following step D:

A: a step of forming a metal thin film;
B: a step of heating the metal thin film to change it into discontinuous insular metal particulates;
C: a step of forming a dielectric thin film over the metal particulates; and
D: a step of drawing said dielectric substrate on heating to change said metal particulates into spheroids.

Here, preferably, said dielectric substrate is made of borosilicate glass, and in said step A the metal thin film is formed by sputtering, and in said step C borosilicate glass is sputtered to form the dielectric thin film. The heating temperatures of the step B and the step D are preferably not higher than melting temperature of the substrate.

Let us compare the present invention with the prior art wherein metal thin films and dielectric thin films are alternately deposited. According to the present invention, whenever a metal thin film is formed, the metal thin film is heated to coagulate the metal in the metal thin film into discontinuous insular metal particulates. Because heating is given every time a metal thin film is formed, metal particulates coagulate to become relatively large particulates. As a result, the extinction ratio per one layer increases, and the necessary number of layers decreases, and at the same time the total film thickness can be reduced. This in turn prevents the polarizing layer from peeling off from the substrate.

Polarizing layers are preferably formed on both faces of a transparent substrate. In this way, the film thickness per one polarizing layer can be reduced to about one half; the possibility of peeling can be reduced further.

EMBODIMENTS

Embodiment 1

Figure 1:
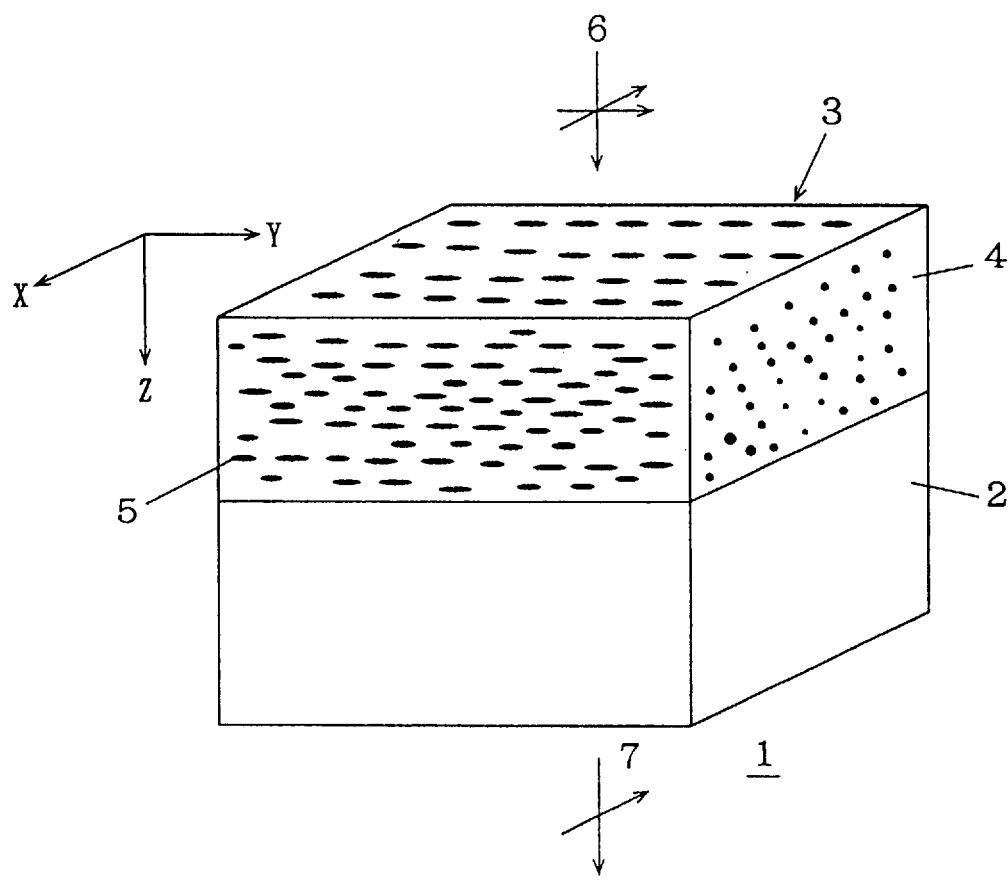
FIG. 1 is a perspective view showing the polarizer of an embodiment.
Figure 2:
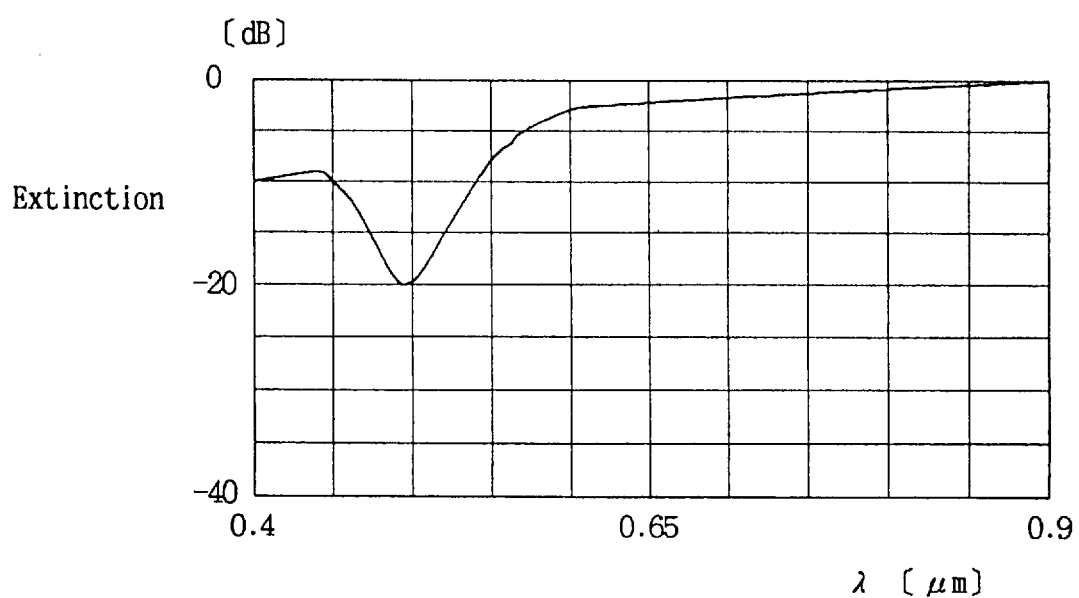
FIG. 2 is a characteristic diagram showing the extinction characteristic before drawing of the polarizer of the embodiment.
Figure 3:
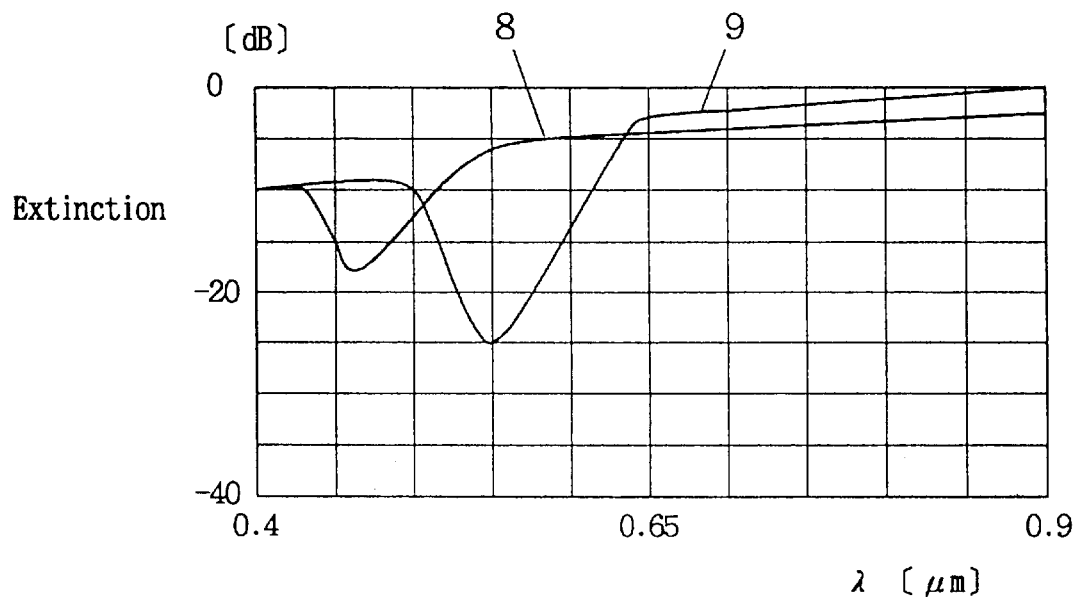
FIG. 3 is a characteristic diagram showing the extinction characteristic after drawing of the polarizer of the embodiment.

FIG. 1 through FIG. 3 show a polarizer 1 of the embodiment. In FIG. 2, 2 denotes a glass substrate. For example, borosilicate glass such as Pyrex glass (Pyrex is a trade mark of Corning Glass Industry, Inc.) and BK glass (BK is a trade name of HOYA Corporation) may be used. In addition to them, high melting point glasses such as silica glass and low melting point glasses such as soda glass may be used. In place of the glass substrate 2, another transparent material may be used, but glass is inexpensive and can be easily drawn. In the present specification, transparency means that the material is transparent to the wavelength used. Of various glass materials, borosilicate glass is suited to the substrate 2, since the coefficient of cubical expansion of borosilicate glass is close to the coefficient of cubical expansion ($90\sim96\times10^{-7}/°C.$) of the Ni—Fe alloy to be used for the holder of the optical isolator and borosilicate glass can easily seal the holder. For example, the coefficient of cubical expansion of BK7 glass is $72\sim89\times10^{-7}/°C$.

3 denotes a polarizing layer wherein spheroidal metal particulates 5 are almost homogeneously dispersed in a dielectric 4. The material of the dielectric 4 is desirably the same material as that of the substrate 2; for example, if Pyrex is used for the substrate 2, then Pyrex is desirably used for the dielectric 4 to match their coefficients of cubical expansion. The metal particulates 5 are preferably precious metals such as Au, Ag, Pt, Rh and Ir or transition metals such as Cu, Fe, Ni and Cr. Preferable metals are those that have bad wettability with the dielectric 4 and are easy to coagulate, and more over, that are hardly oxidized and can be present as metal particulates 5 in the dielectric 4. Of these materials, specially preferable ones are Au, which is easy to coagulate because of its low melting point, has a bad wettability with glass and is hardly oxidized, and Cu, which is inexpensive and has a bad wettability with glass.

The content of the metal particulates in the polarizing layer 3 is preferably from 5 to 15% by volume. The higher is the content, the greater is the extinction ratio, but if the content exceeds 15%, separation of the phase of the dielectric and that of the metal (metal particulate diameter is about 0.6 $\mu$m) will occur and the polarizer can not be produced.

With regard to the thickness of the polarizing layer, there are no special restrictions; for example, in the embodiment, the film thickness before the drawing was 0.5 $\mu$m. In contrast to it, in the prior art wherein multiple metal layers and dielectric layers are deposited, there is a limit to the total thickness of these layers. When the total thickness before the drawing exceeded 0.5 $\mu$m, peeling off from the substrate 2 took place. In the prior art, to improve the polarizing performance, it is necessary to increase the number of layers, and the resulting increase in the total film thickness will result in the peeling. The peeling of the polarizing layer, if it does occur, will take place during the heat treatment before the drawing; a bubble-like swell will occur over a wide area in the interface between the substrate and the metal layer or in the interface between a metal layer and a dielectric. According to the experiments made by the present inventor, it was found that the peeling of the polarizing layer is related to the formation thereof by depositing a large number of layers and the peeling does not occur if the polarizing layer is formed of a single layer just as the embodiment in which a mixture film of a dielectric and a metal is used.

The metal particulates 5 are spheroidal and have an anisotropy. For example, as shown in FIG. 1, the direction the light advances is defined as the direction Z, and a plane perpendicular to that is defined as the X-Y plane. In FIG. 15 the direction of the major axis of the metal particulates 5 is the direction Y, and the direction of the minor axis is the direction X. The ratio of the major axis length to the minor axis length of the metal particulate 5 is defined as the aspect ratio, and in this specification the average of the aspect ratios of many metal particulates 5 is simply called the aspect ratio. The metal particulates 5 become spheroidal because the metal particulates 5 are stretched together with the substrate 2 in the drawing direction during the drawing after the formation of the film of the polarizing layer 3. The higher is the aspect ratio, the greater is the extinction ratio; at the same time, however, the drawing rate of the substrate 2 also increases, making it difficult to draw, and moreover, the rate of increase in the extinction ratio decreases in the high aspect ratio region. Accordingly, the aspect ratio is preferably from 10 to 30, and more preferably from 15 to 25. The extinction ratio is defined as the energy ratio, expressed in the unit of decibel, of the transmitted light in the direction X and that in the direction Y when nonpolarized input light of the specified wavelength is used; when the energy ratio is 10, the extinction ratio is 10 dB. If the minor axis lengths of the metal particulates 5 increase, the insertion loss of the polarized light in the direction X to be transmitted will increase. In view of this point as well, the aspect ratio is preferably 10 or over, and more preferably 15 or over, and preferably, the minor axis length is short and the insertion loss is small. If the mean major axis length of the metal particulates 5 increases, the peak wavelength of absorption in the direction Y will increase and come closer to the wavelength range used by the optical communication (about 1.3 μm). However, it is taken into consideration that the aspect ratio of the metal particulates has production-related limitations and the increase in the minor axis length invites insertion loss, the length of the major axis itself has a limit.

The conditions for the metal particulates are preferably that the aspect ratio is from 10 to 30, that the average of the major axis length is from 10 to 300 nm, and that the average of the minor axis length is from 1 to 10 nm; more preferably that the aspect ratio is from 10 to 30, that the average of the major axis length is from 30 to 200 nm, and that the average of the minor axis length is from 2 to 10 nm; and most preferably that the aspect ratio is from 15 to 25, that the average of the major axis length is from 40 to 200 nm, and that the average of the minor axis length is from 2 to 10 nm.

In the case of FIG. 1, the polarized light component in the direction Y of the incident light 6 entering in the direction Z is absorbed by the resonance with the free electrons of the metal particulates 5, and the polarized light component in the direction X has a high transmissivity and becomes the polarized outgoing light 7. There is a difference in the peak wavelength of absorption between the direction X and the direction Y; in the direction Y the peak of absorption is at a longer wavelength than that of the direction X. When not particularly specified, the above-mentioned extinction ratio is determined by the wavelength at which the peak of absorption occurs in the direction Y.

Experiment

Pyrex #7740 (Pyrex #7740 is a trade name of Corning Glass Industry Inc.) was used for the glass substrate 2. The composition of the glass substrate 2 is SiO2 80.8%. Al2O3 2.3%, B2O3 12.5%, Na2O 4.0% and the balance being minor components such as Fe2O3 and K2O; the composition is given by weight percent. Its softening point is 820° C. The size of the substrate 2 is 76 mm long, 10 mm wide and 1 mm thick.

To achieve 10 vol. % of the metal content in the polarizing layer 3, Pyrex glass (the same Pyrex #7740 as the substrate 2) and Au were used as targets, and Au as metal particulates and Pyrex as the dielectric were simultaneously sputtered on the substrate 2 by dual magnetron sputtering. The sputtering conditions included that the RF power was 20 W, the sputtering gas was Ar and the pressure was $2.0 \times 10^{-3}$ Torr, and the flow rate of Ar was 10 cc/m.

The polarizing layer was formed as a single film, and its film thickness was 0.5 μm before the drawing. The substrate 2 after the film formation was heat-treated for one hour at 700° C. in the atmosphere to make the metal coagulate into metal particulates 5. The resulted metal particulates before the drawing had a mean grain size (diameter) of about 120 nm. and the grain size distribution was from 100 to 150 nm.

The spectral transmission under this condition is shown in FIG. 2. The axis of ordinates indicates the extinction ratio showing the ratio of the incident light 6 to the outgoing light 7 in the unit of dB. The axis of abscissas shows the wavelength used. There is a peak of absorption of about 20 dB near 0.5 μm. Next, the substrate 2 was drawn by applying forces of 45 kg/mm² on both the ends of the substrate in opposite directions. The drawing conditions are preferably that the force is from 10 to 100 kg/mm², that the temperature at the time of drawing is from 500° to 800° C., and more preferably that the temperature is from 650° to 700° C. The preferable range of amount of drawing is from 40 to 300 mm in drawing length for the substrate 2 of 76 mm long. This means that the drawing rate is from 50 to 400%. In the embodiment, forces of 45 kg/mm² were applied on both the ends of the substrate 2 at 675° C. in the atmosphere to draw the substrate 2 by 50 mm. As a result, the film thickness of the polarizing layer 3 became about 0.3 μm. In the polarizer thus obtained, the aspect ratio of the metal particulates 5 was 20 in average, and the major axis length thereof was about 80 nm±10 mn, and the minor axis length thereof was about 4 nm±2 nm. The extinction characteristics of the polarizer obtained are shown in FIG. 3. The axis of abscissa shows the wavelength, and the axis of ordinates shows the extinction ratio. 8 denotes the extinction ratio of the light polarized in the direction X of FIG. 1, and 9 denotes the extinction ratio of the light polarized in the direction Y of FIG. 1. As is clear from FIG. 3, at the wavelength of 0.55 μm, an extinction ratio of 20 dB was achieved.

Figure 5:
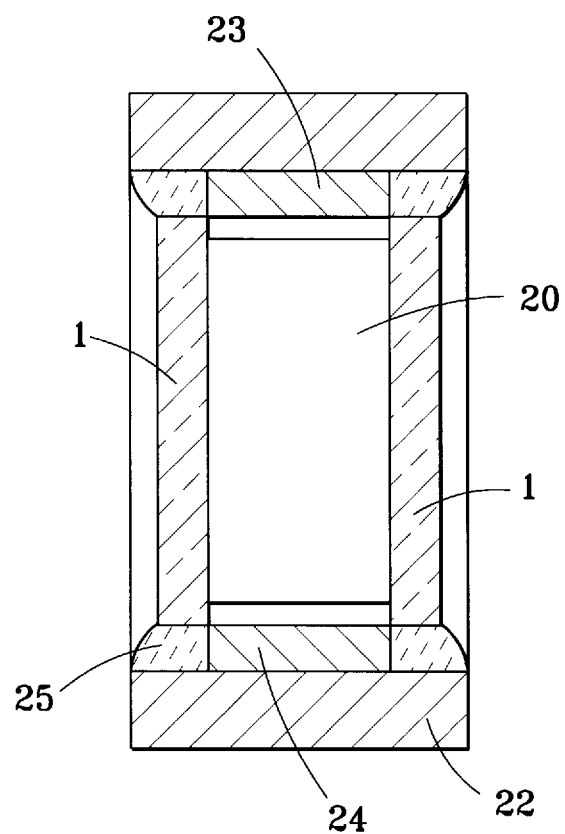
FIG. 5 is a schematic view of an optical isolator including a polarizer according to a preferred embodiment of the present invention.

Next, as shown in FIG. 5, the polarizers 1 thus obtained were arranged to sandwich a Faraday rotator 20, magnets 23, 24 were coaxially arranged around the Faraday rotator, and they were put into a Ni–Fe holder 22 to produce an optical isolator. Sealing glass 25 was used to hermetically seal the polarizers 1, 1 in the holder. The sealing temperature was 500° C., and because the coefficient of thermal expansion of the substrate 2 and that of the holder were close to each other, hermetic sealing was made successfully.

Embodiment 2

Figure 4:
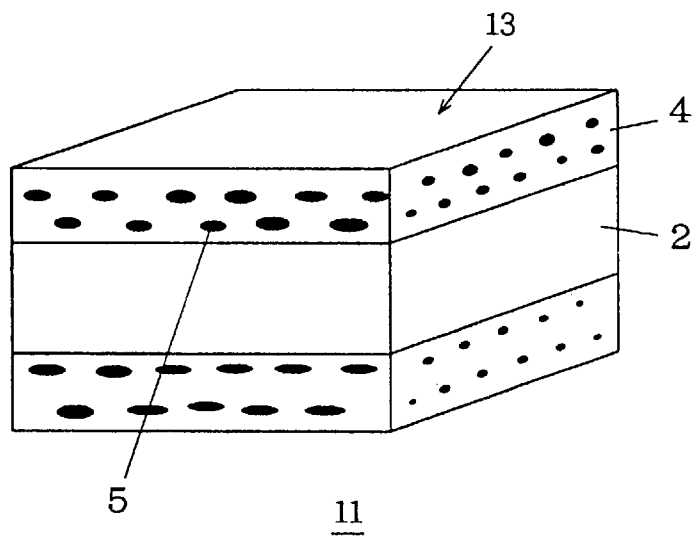
FIG. 4 is a perspective view showing the polarizer of a second embodiment.

A polarizer 11 of the second embodiment is shown in FIG. 4. 2 is a glass substrate similar to the one mentioned above. 13, 13 denote new polarizing layers provided on both the main faces of the substrate 2. 4 is a dielectric similar to the one mentioned above. 5 is metal particulates similar to those mentioned above. The above-mentioned descriptions concerning the glass substrate 2, the dielectric 4 and the metal particulates 5 are all applicable to this embodiment. In this embodiment, a metal thin film is formed on the glass substrate 2, then the metal substrate is heated at a temperature not higher than the softening point of the substrate 2 to generate discontinuous insular metal particulates. Next, a dielectric thin film is formed on the metal thin film. The steps from the formation of a metal thin film to the formation of a dielectric thin film are repeated several times, then the substrate 2 is drawn on heating to stretch the metal particulates in the drawing direction and deform them into spheroids. In this way an anisotropy is produced in the metal particulates. Preferably, polarizing layers 13, 13 are provided on both the faces of the substrate 2, but a polarizing layer 13 may be provided on one face only.

Experiment

A piece of glass, similar to that mentioned above, of BK-7 glass being a borosilicate glass and measuring 76 mm×10 mm×1 mm, was used as the glass substrate 2. The BK-7 glass is a trade name of HOYA Corporation, and its composition is $SiO_2$ 69%, $B_2O_3$ 10%, $Na_2O$ 8%, $K_2O$ 8%, and BaO 3% (the composition is given in weight percent, and the softening point is 724° C.). Under the conditions similar to those mentioned above, films were formed on the substrate 2 by using a dual magnetron sputtering system; Cu was used as the target for metal particulates, BK-7 glass was used as the target for the dielectric, and the sputtering conditions were that the RF power was 20 W, the sputtering atmosphere was Ar, the pressure of Ar was $2.0 \times 10^{-3}$ Torr, and the flow rate was 10 cc/m. A Cu film of 8 nm thick was formed by the first process, and this film was heated at 500° C. in the sputtering system for 60 minutes to grow Cu particulates. This heating temperature is preferably not greater than the softening point of BK-7 glass. Next, on the film of the Cu particulates a dielectric layer of BK-7 glass was formed to a film thickness of 50 nm. The cycle consisting of the formation of the Cu film, the heat treatment and the formation of the dielectric film was repeated five times to provide a polarizing layer 13 on one face of the substrate 2. A similar treatment was given on the opposite main face of the substrate 2. Thus polarizing layers 13, 13, each 0.25μ thick before the drawing, were formed on both the faces of the substrate 2.

Next, forces of 45 kg/mm² were applied on both the ends of the substrate 2 in opposite directions to draw, by 50 mm, the substrate being 76 mm long to give a anisotropy to the metal particulates 5. The preferable range of drawing rate is from 50 to 400%. The preferable range of the forces to be applied is from 10 to 100 kg/mm². The heating temperature at the time of drawing is preferably from 550° to 720° C. being not higher than the softening point of the substrate 2, and more preferably from 590° to 650° C., and in the embodiment, the heating temperature was 625° C. Any atmosphere may be used for the drawing. The Polarizer 11 thus obtained showed a extinction ratio of 44 dB. When the polarizing layer 13 was made on only one face of the substrate 2, the extinction ratio was 22 dB.

Now, the peeling of the polarizing layer 13 will be explained. When the peeling did occur, it occurred during the heat treatment after the formation of the metal film. The peeling occurred when a bubble-like swell was generated in the metal film on the entire surface of the substrate 2. The occurrence of the peeling was related to the total number of layers deposited; the greater was the number of layers, the greater was the occurrence of the peeling. When the total film thickness before the drawing was 0.5 μm or under, no peeling occurred. When the total film thickness exceeded 1.25 μm, the occurrence was extremely significant. In the case of the embodiment, larger metal particulates can be obtained because the heat treatment was given whenever a metal film is formed. Hence a large extinction ratio can be achieved even if the total number of layers is made smaller. In consequence the film thickness can be made smaller. For example, the film thickness of the embodiment was 0.25 μm each on both the faces of the substrate 2. Hence the polarizing layers 13, 13 were formed successfully without any peeling.

We claim:

1. A polarizer wherein on at least one main face of a transparent dielectric substrate is formed a polarizing layer wherein metal particulates having an anisotropy are dispersed virtually homogeneously in a glass layer having an expansion coefficient substantially similar to that of said substrate;

characterized by said metal particulates being at least one member material of a group consisting of Au, Cu, Fe, Ni and Cr.

2. A polarizer wherein on at least one main face of a transparent dielectric substrate is formed a polarizing layer wherein metal particulates having an anisotropy are dispersed virtually homogeneously in a glass layer having an expansion coefficient substantially similar to that of said substrate;

characterized by said metal particulates having an aspect ratio ranging from 10 to 30 in average.

3. A polarizer of claim 2 being characterized by said metal particulates having a mean major axis length of 10 to 300 nm and a mean minor axis length of 1 to 10 nm.

4. A polarizer of claim 3 being characterized in that said polarizing layer has a metal particulate content of 5 to 15 volume percent.

5. A polarizer wherein on at least one main face of a transparent dielectric substrate is formed a polarizing layer wherein metal particulates having an anisotropy are dispersed virtually homogeneously in a glass layer having an expansion coefficient substantially similar to that of said substrate;

characterized by said metal particulates being at least one member material of a group consisting of Au, Cu, and Au—Cu alloys.

6. A production method of a polarizer comprising forming a thin film of a mixture of a dielectric and a metal on at least one main face of a transparent dielectric substrate, then heating said thin film to coagulate the metal in the thin film and form metal particulates, then drawing said substrate and said thin film on heating to stretch said metal particulates into spheroids.

7. A production method of a polarizer of claim 6, being characterized by only one single layer of said mixture thin film being formed.

8. An optical isolator having a polarizer, a Faraday rotator, a magnet and a holder, wherein said polarizer comprises a polarizing layer on at least one main face of a transparent dielectric substrate, said polarizing layer comprising metal particulates having an anisotropy dispersed virtually homogeneously in a glass layer having an expansion coefficient substantially similar to that of said substrate.

9. A production method of a polarizer comprising repeating the following steps A, B and C plural times in this order on at least one main face of a transparent dielectric substrate, then taking the following step D:

A: a step of forming a metal thin film;

B: a step of heating said metal thin film to change it into discontinuous insular metal particulates;

C: a step of forming a dielectric thin film over said metal particulates; and

D: a step of drawing said dielectric substrate on heating to change said metal particulates into spheroids.

10. A production method of a polarizer of claim 9 being characterized by said dielectric substrate being made of borosilicate glass, said metal thin film being made by sputtering in said step A, and said dielectric thin film being made by sputtering borosilicate glass said step C.

11. A polarizer wherein on at least one main face of a transparent dielectric substrate is formed a polarizing layer wherein metal particulates having an anisotropy are dispersed virtually homogeneously in a glass layer having an expansion coefficient substantially similar to that of said substrate;

characterized by said metal particulates being at least one member material of a group consisting of Au and Cu.

* * * * *